United States Patent
Killian

(10) Patent No.: US 7,871,095 B2
(45) Date of Patent: *Jan. 18, 2011

(54) TWO WHEEL STEERING BICYCLE WITH EACH WHEEL HAVING ITS OWN STEERING CONTROL OPERATED BY RIDER'S LEFT AND RIGHT HAND RESPECTIVELY AND RIDER POSITIONED FACING AN ANGLE GREATER THAN ZERO AND LESS THAN NINTY DEGREES WITH RESPECT TO THE DIRECTION OF MOTION

(76) Inventor: Michael Killian, 39 Beresford Avenue, Drumcondra, Dublin 9 (IE)

( * ) Notice: Subject to any disclaimer, the term of this patent is extended or adjusted under 35 U.S.C. 154(b) by 67 days.

This patent is subject to a terminal disclaimer.

(21) Appl. No.: 12/152,218

(22) Filed: May 14, 2008

(65) Prior Publication Data

US 2009/0283984 A1    Nov. 19, 2009

(51) Int. Cl.
B62K 21/00    (2006.01)
B62K 3/14    (2006.01)
(52) U.S. Cl. .................. 280/270; 280/267; 280/266; 280/261; 280/259; 280/269
(58) Field of Classification Search ............ 280/270, 280/267, 266, 261, 259, 268, 269
See application file for complete search history.

(56) References Cited

U.S. PATENT DOCUMENTS

| | | | |
|---|---|---|---|
| 2,995,384 A | 8/1961 | Rich | |
| 4,157,739 A | 6/1979 | Frye | |
| RE30,547 E * | 3/1981 | Belden | 280/240 |
| 4,506,902 A * | 3/1985 | Maebe | 280/266 |
| 4,650,021 A | 3/1987 | Matsuda | |
| 4,650,022 A * | 3/1987 | Sato et al. | 180/219 |
| 4,664,213 A | 5/1987 | Lin | |
| 4,733,742 A | 3/1988 | Frye | |
| 5,485,893 A * | 1/1996 | Summers | 180/219 |
| 6,102,420 A * | 8/2000 | Hoeksta | 280/269 |
| 6,588,786 B2 * | 7/2003 | Efflandt, Sr. | 280/261 |
| 6,598,892 B1 | 7/2003 | Killian | |
| 7,025,366 B2 | 4/2006 | Killian | |

OTHER PUBLICATIONS

Drysdale 2×2 Motorcycle "http://home.mira.net/niwd/2×2×2/intro.html".
"http://home.Mira.Net/Niwd.2x2x2/intro.html".
"www.tonyfoale.com/gallery/PlayTime/pages/172WS_jpg.htm".

* cited by examiner

*Primary Examiner*—Lesley Morris
*Assistant Examiner*—Marlon A Arce

(57) ABSTRACT

A two wheel steering bicycle with two steering controls and rider positioned facing an angle greater than zero and less than ninety degrees with respect to the direction of motion. A frame member connects the rear head tube to the front head tube. The rear fork can rotate within the rear head tube. A rear steering handle is connected to the rear fork. The front fork can rotate within the front head tube. A front steering handle is connected to the front fork. A seat tube member attaches to the frame member. A bicycle saddle is attached to the seat tube member in such a way as to position the rider facing an angle greater than zero and less than ninety degrees with respect to the longitudinal axis of the frame member.

2 Claims, 6 Drawing Sheets

TWO WHEEL STEERING BICYCLE WITH EACH WHEEL HAVING ITS OWN STEERING CONTROL OPERATED BY RIDER'S LEFT AND RIGHT HAND RESPECTIVELY AND RIDER POSITIONED FACING AN ANGLE GREATER THAN ZERO AND LESS THAN NINTY DEGREES WITH RESPECT TO THE DIRECTION OF MOTION

FIELD OF THE INVENTION

The present invention relates to recreational devices like bicycles.

BACKGROUND OF THE INVENTION

The invention relates to bicycles and comprises a frame member, saddle and two steerable wheels mounted in a longitudinal direction, each having its own steering control. The rider is positioned at an angle greater than zero and less than ninety degrees with respect to the direction of motion. More specifically, the present invention relates to bicycles which can be used to traverse smooth and rough terrain including mountain slopes. The present invention discloses a two wheel steering bicycle with two steering controls and rider positioned facing an angle greater than zero degrees and less than ninety degrees with respect to the direction of motion. The user sits on a saddle connected to the seat tube and balances the device by continuously correcting the orientation of the front and rear wheel with his/her first and second hand respectively. The user's body faces an angle greater than zero degrees and less than ninety degrees with respect to the direction of motion. The user's left hand is held to the left side of the user's body and contacts one of the steering handles. The user's left hand is sufficiently clear of the user's body to allow either pushing or pulling of the steering handle.

The user's right hand is held to the right side of the user's body and contacts the other of the steering handles. The user's right hand is sufficiently clear of the user's body to allow either pushing or pulling of the steering handle. The user's left and right hand operate independently and can execute whatever control to maintain the user in an upright position.

The user must be in a state of constant correction which with practice will become natural and reflex. This device moves the user in a forward direction. The invention is configured with a saddle and a means of powering the device. Preferably the means of propelling the device is a regular bicycle bottom bracket, front sprocket, crank and pedals driving the rear wheel through a combination of bicycle chain and universal joint. The device could also be configured to drive the front wheel or indeed both rear and front wheels. The device could also be configured with a linear drive system. Propelling the device requires actions similar to a regular bicycle. The user moves the pedals in a circular motion which drives the rear wheel. Once the user has mastered the basics of propulsion and turning the user can start introducing his/her weight into the turns by leaning into the turns. The feedback from this device is strongest when the user uses his/her weight. This will excel at carving turns and will work best on open paved areas or grass slopes. It is expected that this invention will be more expressive than a regular bicycle and will reward the operator with much positive feedback of having mastered his/her balance.

SUMMARY OF THE INVENTION

It is an object of the present invention to provide a two wheel steering bicycle with two steering control members and rider positioned facing an angle greater than zero degrees and less than ninety degrees with respect to the direction of motion.

It is a more particular object of the invention to provide a frame member and seat tube member with saddle and drive mechanism. The saddle positions the rider facing an angle greater than zero degrees and less than ninety degrees with respect to the longitudinal axis of the frame member. It is an object of the present invention to provide front and rear bicycle head tubes attached to each end of the frame member.

It is an object of the present invention to provide front and rear wheels supported by forks whose steerer columns extend through respective bicycle headsets and front and rear head tubes.

Each fork steerer column attaches to an associated steering control member.

The rear steering control member is positioned to contact with the user's first hand.

The front steering control member is positioned to contact with the user's second hand.

DESCRIPTION OF THE DRAWINGS

These and other aspects of the present invention will become more evident upon reading the following description of the preferred embodiment in conjunction with the accompanying drawings, in which.

DETAILED DESCRIPTION OF PREFERRED EMBODIMENTS

Figure 1:
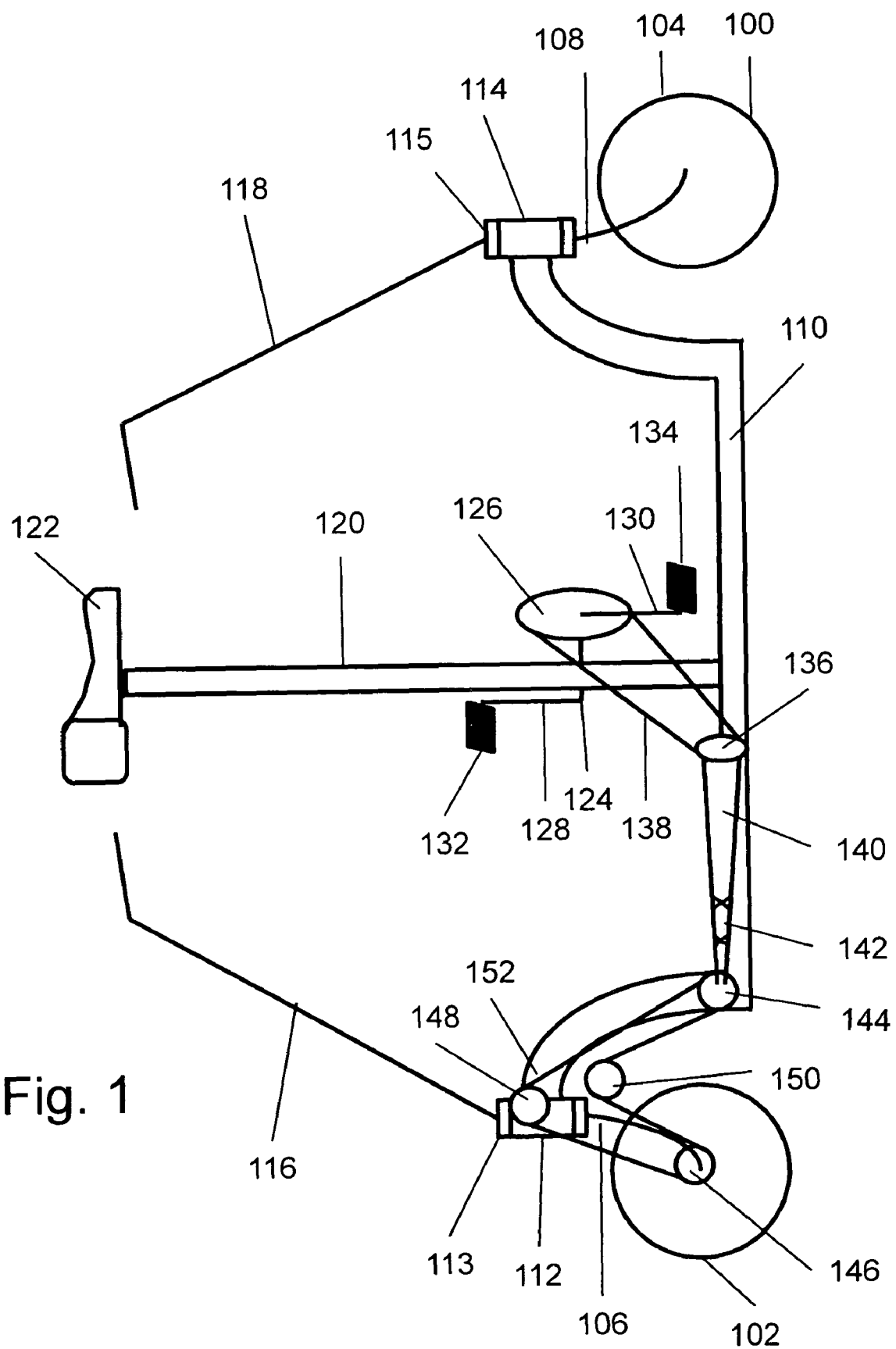
FIG. 1 is a side view of the current invention where the rider's right side and back would be visible.

FIG. 1 illustrates the current invention 100. In FIG. 1 rear wheel 102 and front wheel 104 support rear fork 106 and front fork 108 respectively from the ground. Frame member 110 connects to rear head tube 112 and front head tube 114. The steerer column of rear fork 106 extends through rear headset 113 and rear head tube 112 to connect with rear steering control member 116. The steerer column of front fork 108 extends through front headset 115 and front head tube 114 to connect with front steering control member 118. Seat tube member 120 connects to frame member 110. Saddle 122 connects to seat tube member 120. Bicycle left crank 128 and left pedal 132 connect to the left side of bicycle bottom bracket 124. First sprocket 126, right crank 130 and right pedal 134 connect to the right side of bicycle bottom bracket 123. First sprocket 126 drives second sprocket 136 using first chain 138. Second sprocket 136 drives third sprocket 144 using shaft 140 and double universal joint 142. Shaft 140 and double universal joint 142 are positioned low and to the rear of frame member 110. This provides clearance for rider's left foot as rider's left foot pedals left pedal 132. Third sprocket 144 drives rear wheel sprocket 146 using second chain 152 which passes over idler pulley 148 and idler pulley 150.

Figure 2:
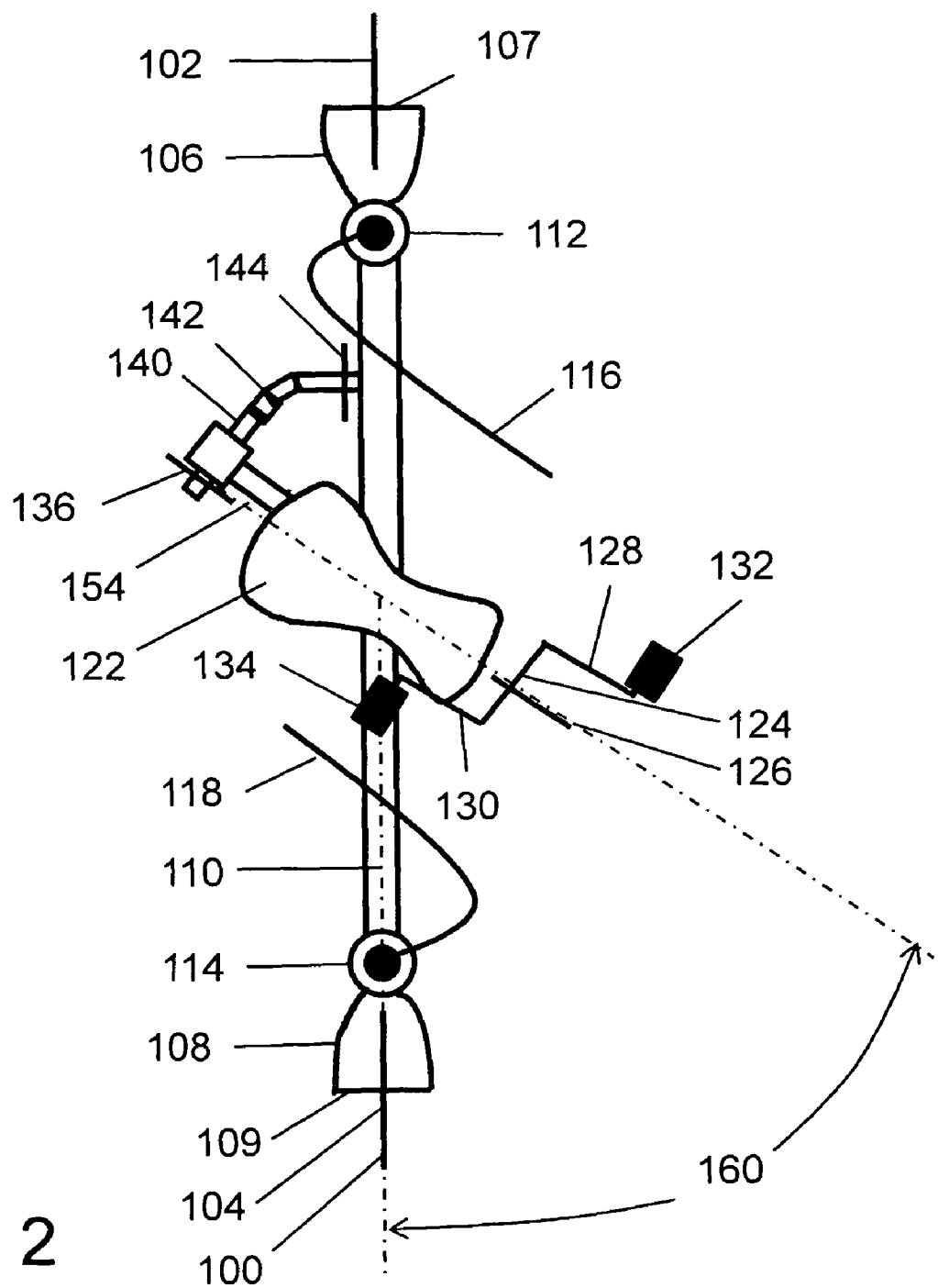
FIG. 2 is a top view of the current invention.

FIG. 2 is a top view of the current invention 100. In FIG. 2 rear wheel 102 is connected to rear fork 106 at axle 107. Front wheel 104 is connected to front fork 108 at axle 109. Frame member 110 connects to rear head tube 112 and front head tube 114. Saddle 122 connects to seat tube member. The longitudinal axis of saddle 122 is positioned at an angle 160 with respect to the longitudinal axis of frame member 110. The angle 160 is greater than zero degrees and less than ninety degrees. Saddle 122 positions the rider facing angle 160 with respect to the longitudinal axis of frame member 110. The steerer column of rear fork 106 extends through rear head tube 112 to connect with rear steering control member 116. The steerer column of front fork 108 extends through front head tube 114 to connect with front steering control member 118. Bicycle left crank 128 and left pedal 132 connect to the left side of bicycle bottom bracket 124. Bicycle right crank 130 and right pedal 134 connect to the right side of bicycle bottom bracket 124. Second sprocket 136 connects to shaft 140. Shaft 140 is supported from frame member 110 by shaft support member 154. Double universal joint 142 connects to shaft 140 and third sprocket 144.

Figure 3:
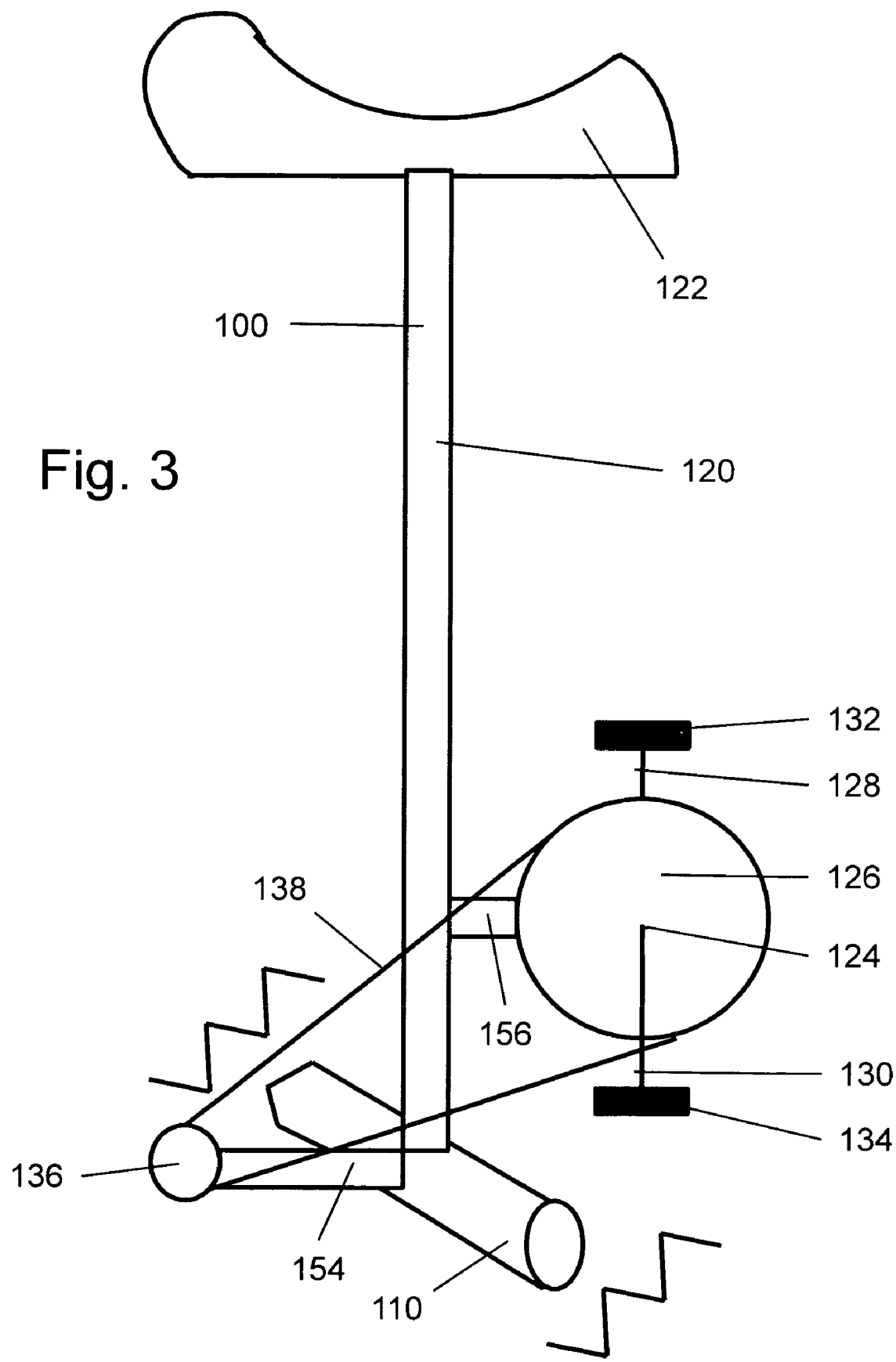
FIG. 3 is a side view of a portion of the current invention detailing the saddle, seatpost, first sprocket, second sprocket, pedals and first chain.

FIG. 3 illustrates a portion of the current invention which illustrates the first chain routing. In FIG. 3 saddle 122 connects to seat tube member 120. Seat tube member 120 connects to frame member 110. Bottom bracket 124 is supported by bottom bracket support member 156. Bicycle left crank 128 and left pedal 132 connect to the left side of bicycle bottom bracket 124. First sprocket 126, right crank 130 and right pedal 134 connect to the right side of bicycle bottom bracket 123. First sprocket 126 drives second sprocket 136 using first chain 138. Shaft support member 154 connects to frame member 110.

Figure 4:
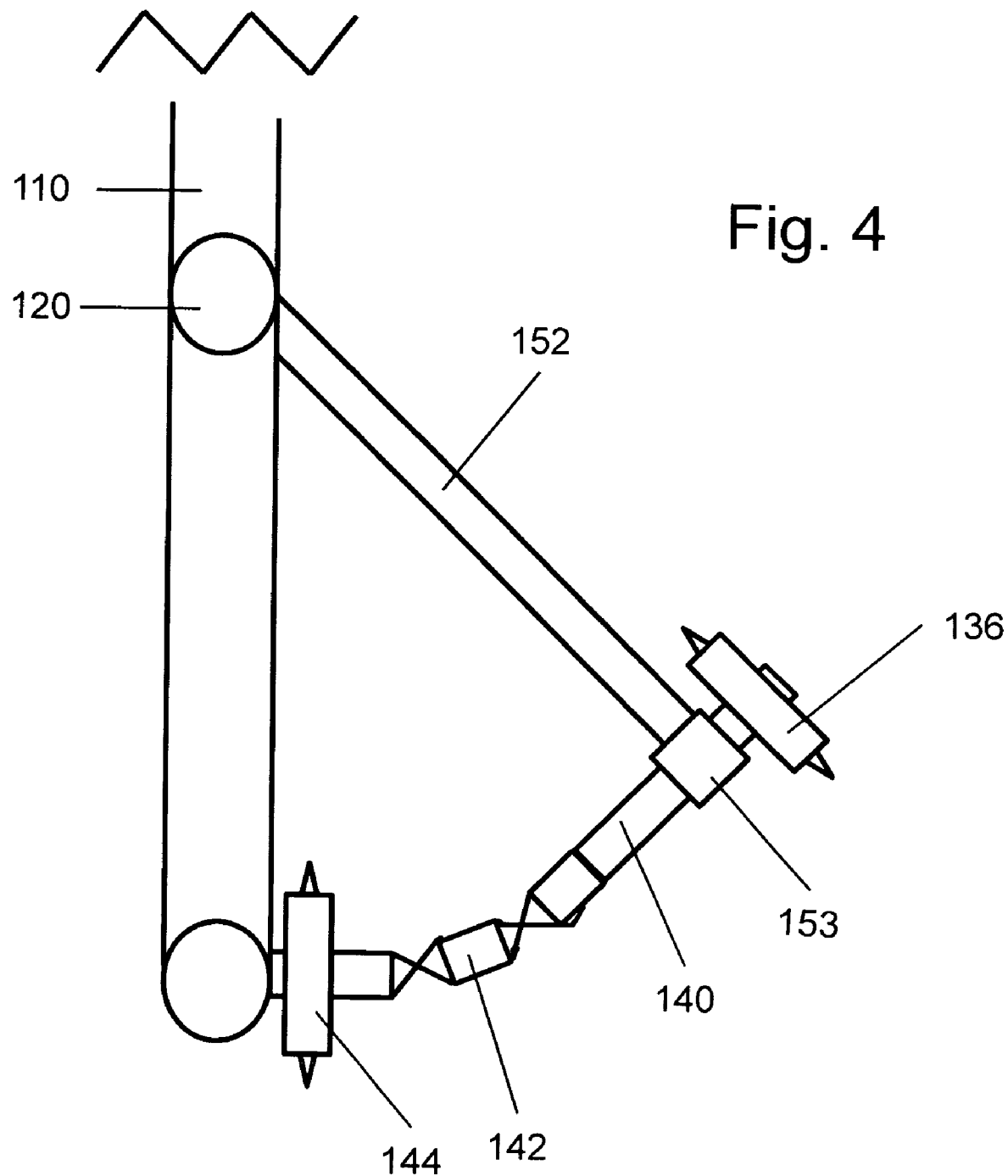
FIG. 4 is a top view side view of a portion of the current invention detailing the second sprocket, double universal joint and third sprocket.

FIG. 4 is a top view of a portion of the current invention which illustrates the section of the drivetrain between second sprocket 136 and third sprocket 144. In FIG. 4 shaft 140 is supported by shaft support member 152 and bearing housing 153. Shaft support member 152 connects to frame member 110. Seat tube member 120 is illustrated.

Second sprocket 136 is attached to shaft 140. Double universal joint 142 connects shaft 140 with third sprocket 144. Double universal joint 142 is used to transmit rotary motion between second sprocket 136 and third sprocket 144 which have different axes of rotation.

Figure 5:
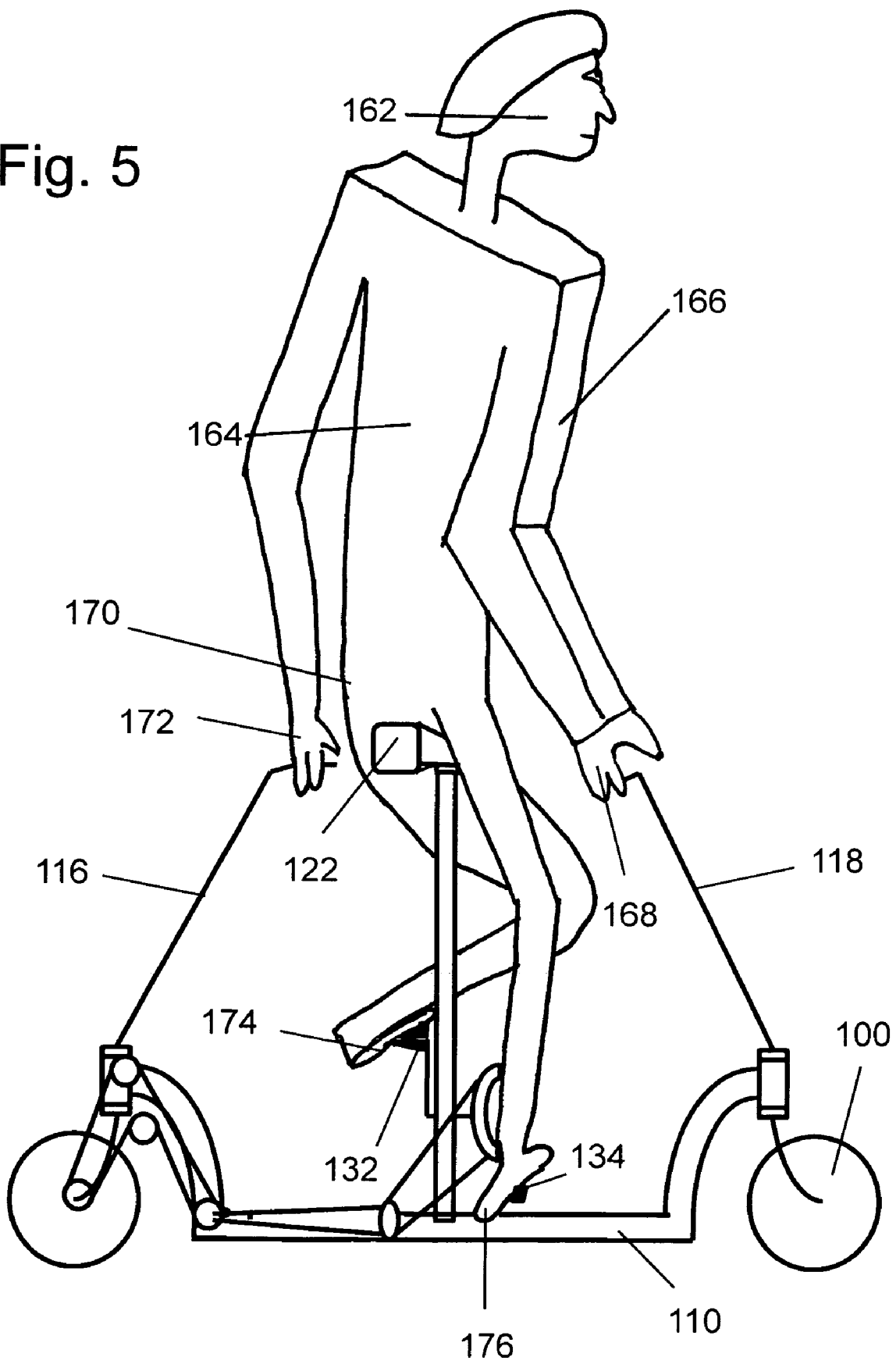
FIG. 5 is a side view of a user riding the current invention where the user's right side and back are visible.

FIG. 5 illustrates a rider 162 riding the current invention 100. In FIG. 5 the rider's back 164 and right side 166 are illustrated. The rider's right hand 168 contacts front steering control member 118. The rider's seat 170 rests on saddle 122. The rider's left hand 172 contacts rear steering control member 116. The rider's right foot 176 is positioned on right pedal 134. The riders left foot 174 is positioned on left pedal 132. Frame member 110 passes under the rider's feet.

Figure 6:
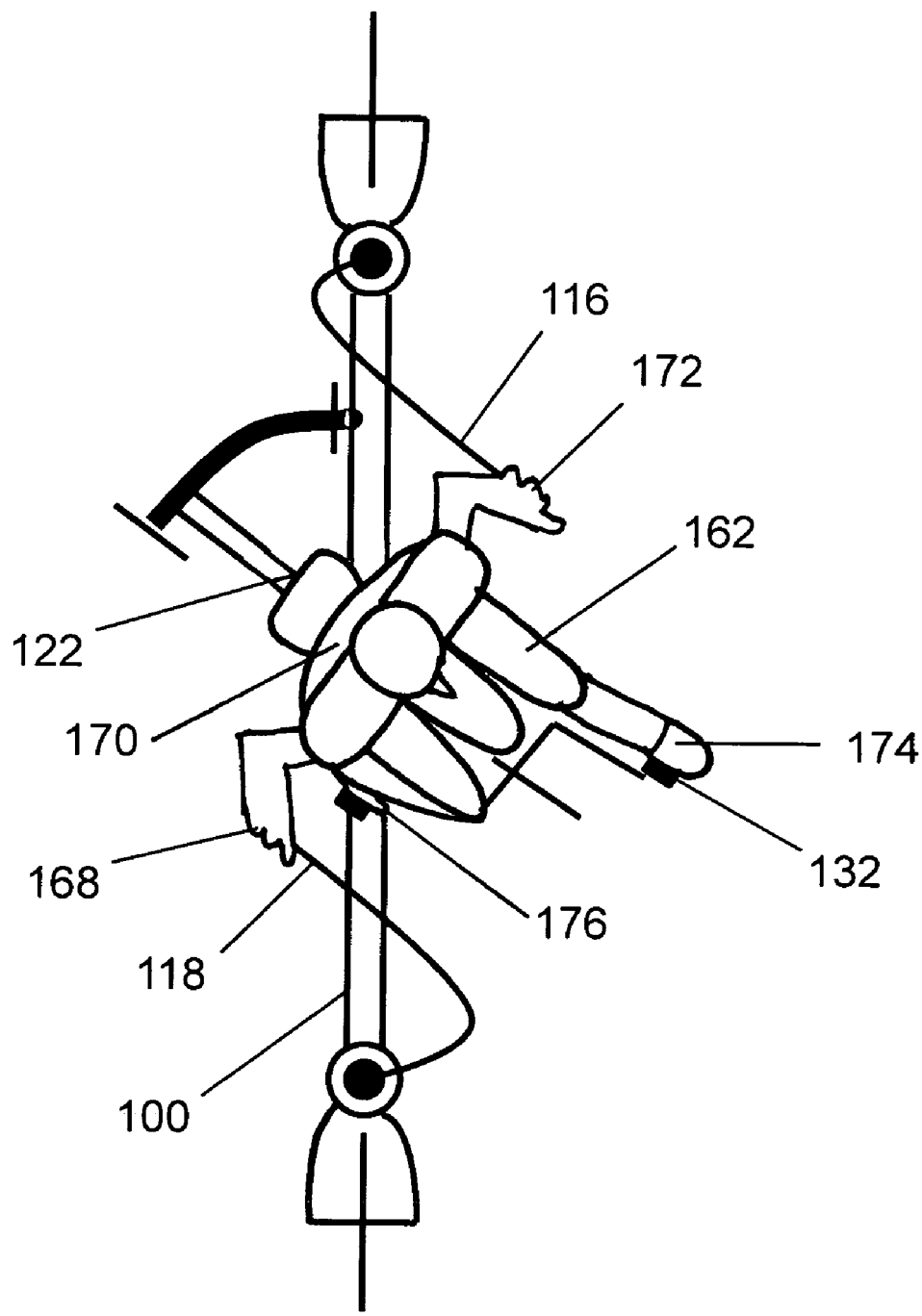
FIG. 6 is a top view of a user riding the current invention.

FIG. 6 illustrates the top view of rider 162 riding the current invention 100. In FIG. 6 the rider's right hand 168 contacts front steering control member 118. The rider's seat 170 rests on saddle 122. The rider's left hand 172 contacts rear steering control member 116. The rider's right foot 176 is positioned on right pedal. The riders left foot 174 is positioned on left pedal 132.

ADDITIONAL FEATURES

In view of the wide variety of embodiments to which the principles of the invention can be applied, it should be apparent that the detailed description of a preferred embodiment is illustrative only and should not be taken as limiting the scope of the invention. For example power could be transmitted to the device using a wide variety of linkages and levers could be used instead of the rotational pedal mechanism illustrated.

Also, the principles of the present invention work equally well whether the vehicle is self-propelled, rider-propelled, gravity propelled, or propelled by other sources, such as wind. Accordingly, the vehicle of the present invention could readily include forms of propulsion, such as a motor, sail or other forms of propulsion without compromising the principles of the present invention.

I claim:

1. A two wheel steering bicycle with independently steerable wheels comprising:
    a frame member and
    a rear head tube member connected to said frame member wherein:
        said rear head tube member having a center point; and
        said rear head tube member having a longitudinal axis;
    a rear headset member;
    a front head tube member connected to said frame member wherein:
        said front head tube member having a center point; and
        said front head tube member having a longitudinal axis;
    a front headset member;
    a seat tube member connected to said frame member;
    a rear fork member that extends upward with said fork member pivotably mounted within said rear head tube member using said rear headset member;
    a single rear wheel being rotatably mounted on said rear fork member;
    a front fork member that extends upward with said fork member pivotably mounted within said front head tube member using said front headset member;
    a single front wheel being rotatably mounted on said front fork member;
    a rear steering handle connected to said rear fork member;
    a front steering handle connected to said front fork member;
    a saddle connected to said seat tube wherein:
        said saddle orients the rider facing an angle greater than zero degrees and less than ninety degrees to a vertical plane that intersects said center point of said rear head tube member and said center point of said front head tube member;
    a pedal mechanism including means of transferring rotational energy from said pedal mechanism to said rear wheel;
    a rear wheel steering means that is independent of pivotal motion of said front fork member about said longitudinal axis of said front head tube member;
    a front wheel steering means that is independent of pivotal motion of said rear fork member about said longitudinal axis of said rear head tube member;
    whereby the rider can steer the rear wheel independently of steering of the front wheel and steer the front wheel independently of steering of the rear wheel.

2. The two wheel steering bicycle with independently steerable wheels according to claim 1, wherein said pedal mechanism include:
    chain and cogs for transferring rotational energy from said pedal mechanism to said rear wheel.

* * * * *